(12) United States Patent
Oh et al.

(10) Patent No.: US 9,645,422 B2
(45) Date of Patent: May 9, 2017

(54) WINDOW FOR DISPLAY DEVICE, DISPLAY DEVICE INCLUDING THE SAME, AND MANUFACTURING THE SAME

(71) Applicant: SAMSUNG DISPLAY CO., LTD., Yongin, Gyeonggi-Do (KR)

(72) Inventors: Jee-Seok Oh, Yongin (KR); Sang Gu Kim, Yongin (KR); Jeong Ho Hwang, Yongin (KR); Joo Il Kim, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 154 days.

(21) Appl. No.: 14/267,280

(22) Filed: May 1, 2014

(65) Prior Publication Data
US 2015/0017393 A1   Jan. 15, 2015

(30) Foreign Application Priority Data
Jul. 9, 2013  (KR) .................. 10-2013-0080299

(51) Int. Cl.
| *G02F 1/1333* | (2006.01) |
| *B32B 15/08* | (2006.01) |
| *B32B 3/06* | (2006.01) |
| *B29C 45/14* | (2006.01) |
| *B29K 705/00* | (2006.01) |
| *B29L 31/34* | (2006.01) |

(52) U.S. Cl.
CPC .. *G02F 1/133308* (2013.01); *B29C 45/14811* (2013.01); *B32B 3/06* (2013.01); *B32B 15/08* (2013.01); *B29C 45/14311* (2013.01); *B29K 2705/00* (2013.01); *B29K 2715/006* (2013.01); *B29K 2995/007* (2013.01); *B29L 2031/3475* (2013.01); *B32B 2457/00* (2013.01); *G02F 2001/13332* (2013.01); *G02F 2001/133331* (2013.01); *Y10T 428/24653* (2015.01)

(58) Field of Classification Search
CPC ....... G02F 1/33308; G02F 2001/13332; G02F 2001/133331; G02F 1/1637; G02F 1/1601; B32B 15/00; B32B 15/04; B32B 15/08; B32B 1/00; B32B 1/04; B32B 2457/20; B32B 2457/202; B32B 2457/206; B32B 2457/208; B32B 3/06
USPC .......................................... 428/457, 172, 412
See application file for complete search history.

(56) References Cited

U.S. PATENT DOCUMENTS

| 2011/0045311 A1* | 2/2011 | Itoh ......................... B05D 7/04 428/480 |
| 2012/0107575 A1* | 5/2012 | Yi ......................... G06F 1/1626 428/195.1 |

FOREIGN PATENT DOCUMENTS

| KR | 10-0851025 B1 | 8/2008 |
| KR | 10-2011-0117747 A | 10/2011 |
| KR | 10-2013-0003491 A | 1/2013 |
| KR | 10-2013-0013767 A | 2/2013 |

\* cited by examiner

*Primary Examiner* — Catherine A Simone
(74) *Attorney, Agent, or Firm* — Lee & Morse P.C.

(57) ABSTRACT

The present disclosure relates to a curved window, a method for manufacturing the same, and a display device including the same. The curved window for a display device includes a curved polymer resin layer, a high-hardness film over the curved polymer resin layer, and a curved metal film under the curved polymer resin layer.

17 Claims, 9 Drawing Sheets

WINDOW FOR DISPLAY DEVICE, DISPLAY DEVICE INCLUDING THE SAME, AND MANUFACTURING THE SAME

CROSS-REFERENCE TO RELATED APPLICATION

The present application claims priority under 35 U.S.C. §119 to Korean Patent Application No. 10-2013-0080299, filed on Jul. 9, 2013, in the Korean Intellectual Property Office, and entitled: "Window For Display Device, Display Device Including The Same, and Method For Manufacturing The Same," which is incorporated by reference herein in its entirety.

BACKGROUND

1. Field

The present disclosure relates to a window for a display device, a display device including the same, and a method for manufacturing a window for a display device.

2. Description of the Related Art

A variety of mobile electronic devices such as mobile phones, navigation systems, digital cameras, electronic books, portable game machines, and various terminals have come into use. The mobile electronic devices include a liquid crystal display (LCD) or organic light emitting diode (OLED) display as a display device.

A typical display device used in such mobile electronic devices has a transparent window which is provided at the front of a display panel and through which a user can see a display unit. Because the window is formed at the outermost position of the device, the window should be resistant to external impact so as to protect the display panel inside the display device. Further, instead of a conventional method in which a switch or keyboard is used as an input device, a structure employing a touch panel having a display screen integrated therein has become widespread. Because the surface of the window is more frequently contacted with a finger or the like, a window for such touchscreen devices should have higher strength.

SUMMARY

Exemplary embodiments of the present disclosure provide a window for a display device, which includes a curved metal film, a display device including the same, and a method for manufacturing a window for a display device. An exemplary embodiment of the present disclosure provides a curved window for a display device, including: a curved polymer resin layer; a high-hardness film positioned over the curved polymer resin layer; and a curved metal film positioned under the curved polymer resin layer. The curved window may further include an adhesive film positioned between the high-hardness film and the curved polymer resin layer. The curved metal film may be a stainless steel film. The curved metal film may have a thickness of about 0.1 mm to about 0.2 mm. The curved metal film may include a plurality of coupling grooves formed at both sides thereof, and the curved metal film and the curved polymer resin layer may be coupled through the coupling grooves. The coupling grooves may be positioned at even intervals. The curved metal film may further include a protrusion, and the protrusion may cover an exposed bottom surface of the curved polymer resin layer. The curved polymer resin layer may have a thickness of about 1 mm or less.

Another exemplary embodiment of the present disclosure provides a method for manufacturing a curved window. The method includes preparing a curved metal film and injection-molding a curved polymer resin layer over the prepared curved metal film.

The preparing of the curved metal film may include cutting the metal film and pressurizing the cut metal film. Both ends of the pressurized metal film may be curved. The pressurizing of the cut metal film may be performed through press molding. The method may further include stacking a high-hardness film over the curved polymer resin layer. The curved metal film may include a plurality of coupling grooves formed at both sides thereof, and a part of the polymer resin may be positioned in the coupling grooves through injection molding.

Yet another exemplary embodiment of the present disclosure provides a display device including a display panel and a curved window positioned over the display panel. The curved window includes a curved polymer resin layer and a curved metal film positioned under the curved polymer resin layer.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
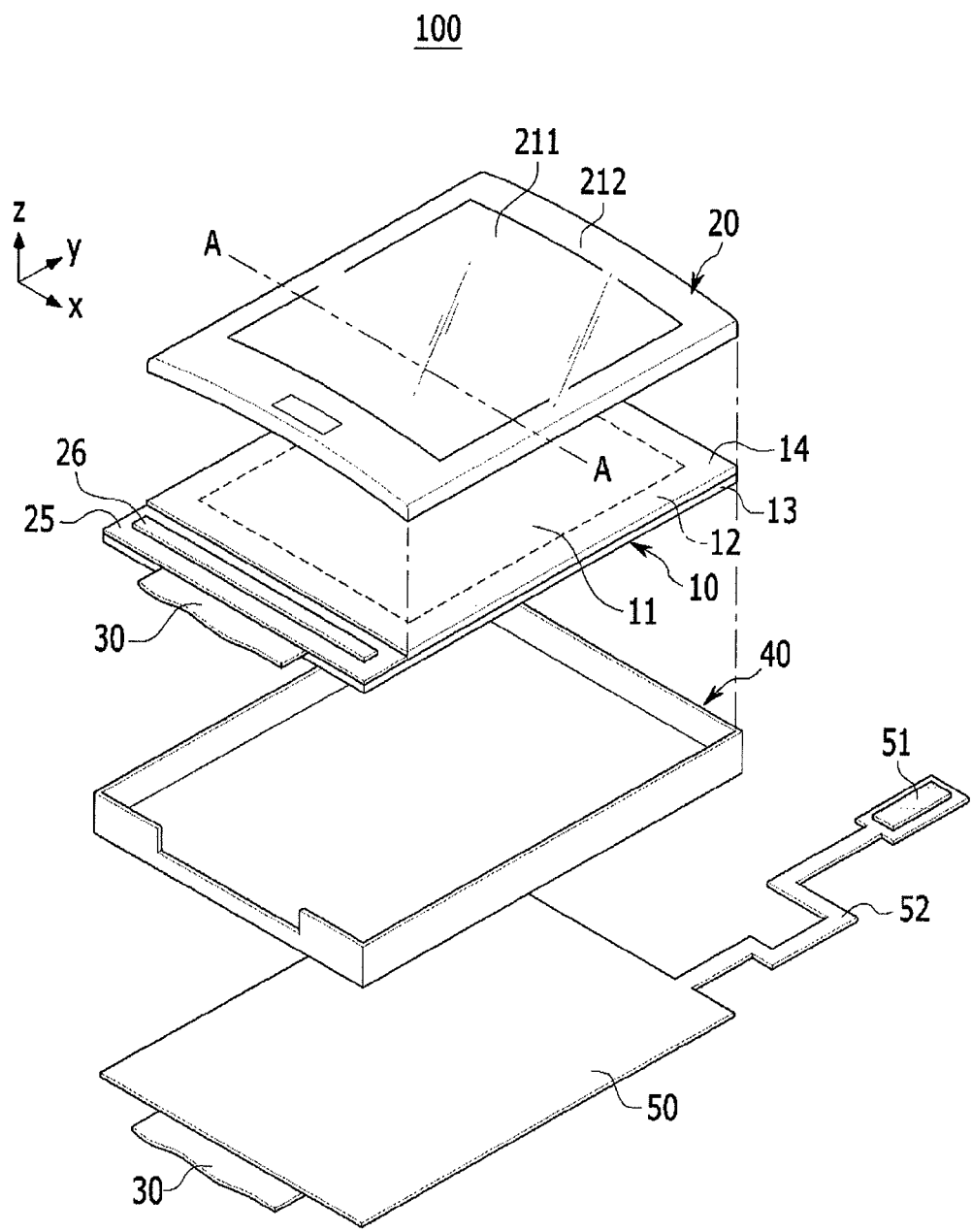
FIG. 1 illustrates an exploded perspective view of a display device including a curved window according to an exemplary embodiment of the present disclosure.

The present disclosure is described with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, and the like, may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

FIG. 1 illustrates an exploded perspective view of a display device 100 according to an exemplary embodiment of the present disclosure. Referring to FIG. 1, the display device 100 according to the exemplary embodiment of the present disclosure includes a display panel 10 for displaying an image, a housing 40 for housing the display panel 10 and various parts, and a window 20 disposed at the front side of the display panel 10 so as to protect the display panel 10.

The display panel 10 may include an organic light emitting panel. On the other hand, the display panel 10 may include display panels other than the organic light emitting panel, for example, a liquid crystal display panel. In the exemplary embodiment, the organic light emitting display panel will be taken as an example for description, but the present disclosure is not limited thereto. FIG. 1 illustrates a flat display panel as an example of the present disclosure. However, the present disclosure is not limited thereto, as a curved display panel may be applied.

The display panel 10 is electrically connected to a printed circuit board (PCB) 50 through a flexible printed circuit 30. Over the first substrate 13 of the display panel 10, a plurality of pixels serving as basic units for representing an image are arranged in a matrix shape. The second substrate 14 is coupled to the first substrate 13 through a sealing member so as to protect the pixels. The first substrate 13 may serve as a rear substrate, and the second substrate 14 may serve as a front substrate.

For example, an active matrix organic light emitting panel includes an organic light emitting element and a driving circuit for driving the organic light emitting element. The organic light emitting element includes an anode, an organic emission layer, and a cathode. The driving circuit may include a thin film transistor. The thin film transistor has a source terminal connected to a data line and a gate terminal connected to a gate line. The thin film transistor has a drain electrode connected to any one of the anode and the cathode of the organic light emitting element. The data line and the gate line are connected to the PCB 50 through the flexible printed circuit 30. When an electrical signal is input to the source terminal and the gate terminal of the thin film transistor through the PCB 50, the thin film transistor is turned on or off to output an electrical signal used for pixel driving to the drain terminal.

An integrated circuit chip 26 is mounted on the first substrate 13 so as to control the display panel 10. The integrated circuit chip 26 generates timing signals for applying a data driving signal and a gate driving signal at a proper time. The integrated circuit chip 26 applies the signals to the data line and the gate line of the display panel 10. Around the integrated circuit chip 26, a passivation layer 25 is formed to protect the integrated circuit chip 26. Electronic elements for processing a driving signal are mounted on the PCB 50. The PCB 50 includes a connector 51 and an extension 52, and the extension 52 is installed at one end of the connector 51 so as to transmit an external signal to the PCB 50.

A window 20 is positioned at the front side of the display panel 10 so as to protect the display panel 10. The window 20 serves to protect the display panel 10 from being broken by an external impact. The window 20 may be attached to the display panel 10 through a predetermined adhesive layer. In another embodiment, the display panel 10 and the window 20 may be isolated from each other with an air layer provided therebetween. The window 20 includes a transparent portion 211 and an opaque portion 212. The transparent portion 211 is formed at a portion corresponding to a display region 11 the display panel 10 such that the display region 11 is seen from outside. The opaque portion 212 is formed at a portion corresponding to a non-display region 12 of the display panel 10 such that the non-display region 12 is prevented from being seen from outside. The opaque portion 212 serves to cover wirings or parts formed in the non-display region 12 of the display panel 10 such that the wirings or parts are not seen from outside. The opaque portion 212 may include a product logo or decoration pattern.

Figure 2:
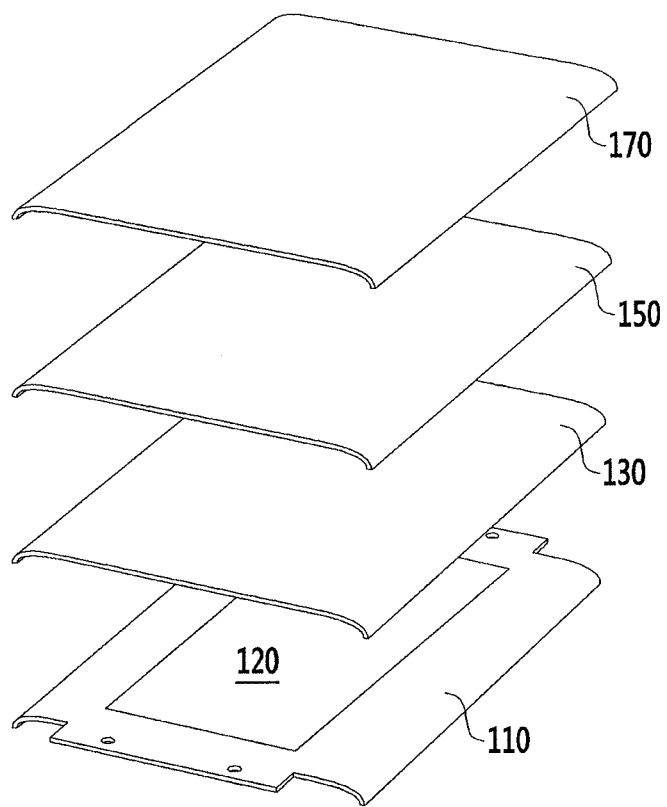
FIG. 2 illustrates an exploded perspective view of the curved window according to the exemplary embodiment of the present disclosure
Figure 3:
FIG. 3 illustrates a cross-sectional view of FIG. 2.
Figure 4:
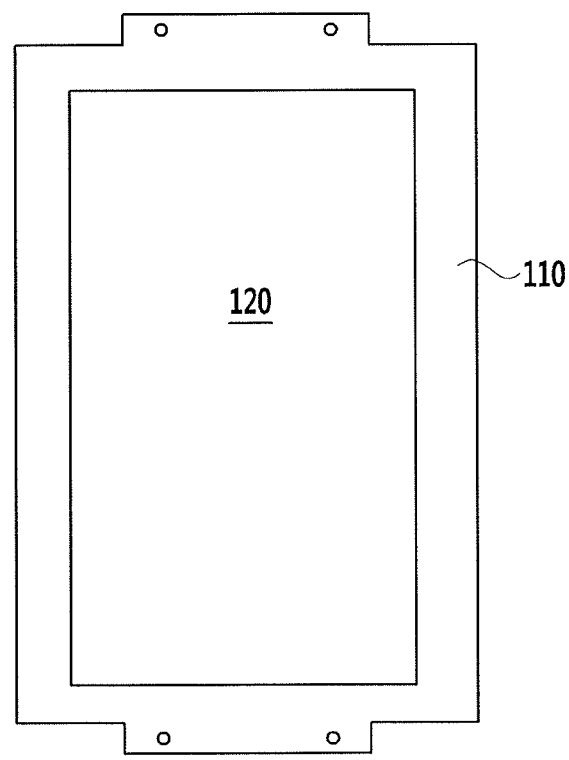
FIG. 4 illustrates a plan view of a metal film according to the exemplary embodiment of the present disclosure.

Referring to FIGS. 2 to 4, the window of the display device according to the embodiment of the present disclosure is described. FIG. 2 illustrates an exploded perspective view of the window according to the exemplary embodiment of the present disclosure. FIG. 3 illustrates a cross-sectional view of the window according to the embodiment of the present disclosure. FIG. 4 illustrates a plan view of a metal film according to the exemplary embodiment of the present disclosure.

The window 20 according to the exemplary embodiment of the present disclosure includes a curved metal film 110, a curved polymer resin layer 130, and a high-hardness film 170. The curved metal film 110 serves to maintain the rigidity of the window according to the exemplary embodiment of the present disclosure, and is positioned on a rear surface of the curved polymer resin layer 130 to be described below, i.e., under the curved polymer resin layer 130. The curved metal film may surround a cut-out portion or transparent region 120 corresponding to the transparent portion 211.

The curved metal film 110 may be formed of any materials for improving the rigidity of the window made of polymer resin. For example, the curved metal film 110 may include a stainless steel film. Further, the curved metal film 110 represents a color unique to the metal, as one of characteristics of the metal. Thus, without a separate printing process, the color of the curved metal film may be selected to represent the color of the window. In this case, since a printing process is omitted, the display device and the window may be manufactured through a simpler process. The thickness of the curved metal film 110 is not limited. However, according to the exemplary embodiment of the present disclosure, the curved metal film 110 may have a thickness of about 0.1 mm to about 0.2 mm. That is because, even a metallic film having a small thickness as described herein may satisfy the rigidity to be provided in the exemplary embodiment of the present disclosure.

The polymer resin layer 130 is positioned over the curved metal film 110 and has a curved shape corresponding to the curved metal film 110. The polymer resin layer 130 substantially determines the shape of the window 20. The polymer resin layer 130 may have a curved shape according to the exemplary embodiment of the present disclosure, but may have a plane shape. The material of the curved polymer resin layer 130 may include polymethylmethacrylate (PMMA) resin or polycarbonate (PC) resin. The curved polymer resin layer 130 is not limited thereto, but any materials may be applied as long as the transparency of the materials is secured after they are hardened.

The curved polymer resin layer 130 according to the exemplary embodiment of the present disclosure may have a thickness of about 1 mm or less. As described herein, the curved polymer resin 130 not only helps determine the shape of the window 20, but also is related to the properties of the window 20. When a curved polymer resin layer having an excessively small thickness is applied, the shape of the window 20 might not be maintained. However, according to the exemplary embodiment of the present disclosure, the rigidity of the window 20 is improved by the curved metal film 110. Thus, the window 20 may have a slightly smaller thickness than the thickness described herein.

The high-hardness film 170 is positioned over the curved polymer resin layer 130, and serves to improve the hardness of the window according the exemplary embodiment of the present disclosure. In the exemplary embodiment, the high-hardness film is employed, for example. However, the present disclosure is not limited thereto, as any films may be applied as long as they can improve the properties of the window. When the high-hardness film 170 is coupled to the curved polymer resin layer 130, a roll laminating process may be applied, for example. The roll laminating process may be performed by the following process: the high-hardness film 170 is positioned on the outer surface of the curved polymer resin layer 130, and then pressurized and attached by a roller (not illustrated). In order to perform the roll laminating process, an adhesive material may be disposed between the high-hardness film 170 and the curved polymer resin layer 130. In the exemplary embodiment of the present disclosure, an adhesive film 150 may be used as the adhesive material so as to couple the high-hardness film and the curved polymer resin layer. In particular, the adhesive film 150 may include an optical clear adhesive (OCA), for example.

Figure 5A:
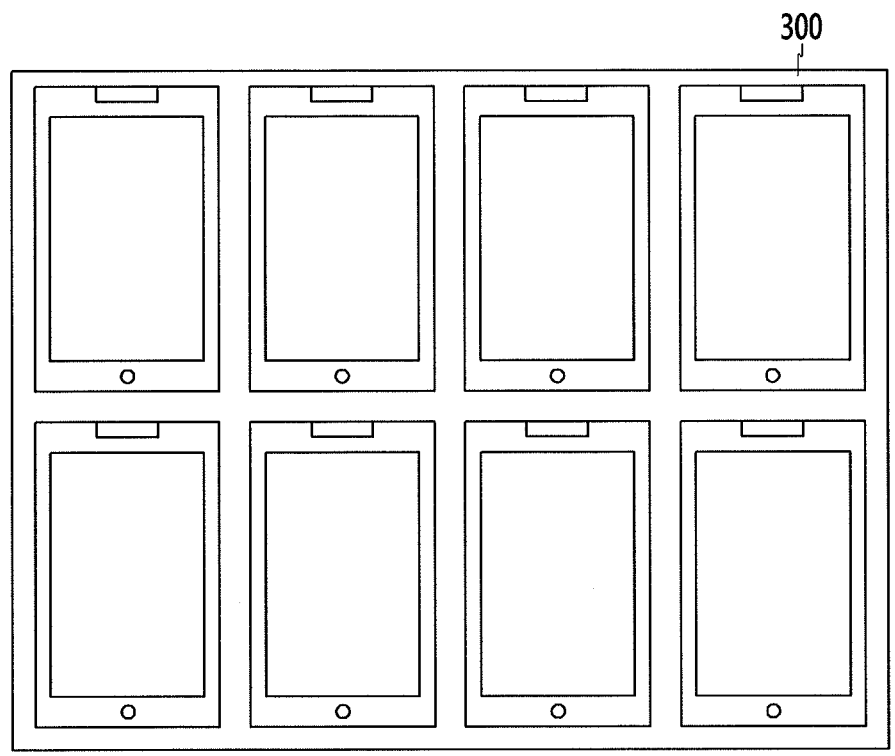
FIGS. 5A-9B illustrate curved windows and methods for manufacturing the same according to exemplary embodiments of the present disclosure.
Figure 5B:
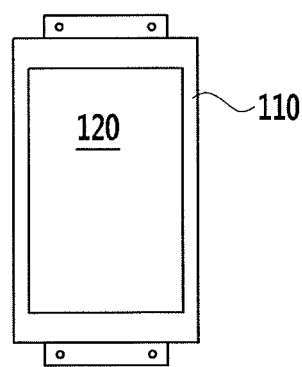

FIGS. 5A-5E illustrate stages in a method for manufacturing a window for a display device according to an exemplary embodiment of the present disclosure is described. First, as illustrated in FIG. 5A, a metal film is prepared, e.g., a plurality of metal films 110 may be prepared on a substrate 300. Any metals for maintaining the rigidity of the window may be used as the metal film. For example, a stainless steel film may be applied. Further, the thickness of the metal film serves to maintain the rigidity of the window. For example, the metal film may have a thickness of about 0.1 mm to about 0.2 mm. The prepared metal film is cut to correspond to a display device as illustrated in FIG. 5B.

Figure 5C:
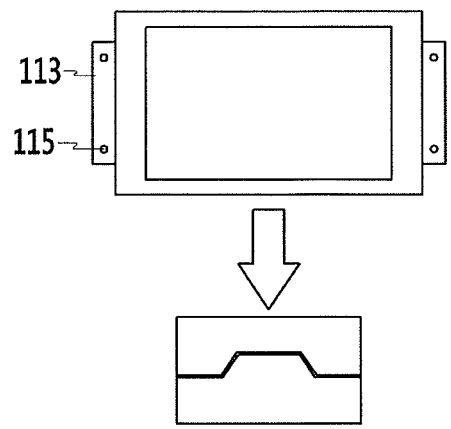
Figure 5D:
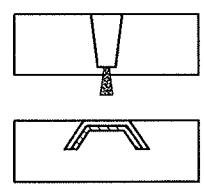
Figure 5E:
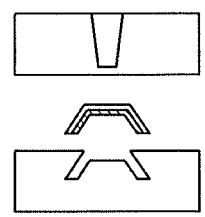

Then, as illustrated in FIG. 5C, the cut metal film is pressurized to form a curved metal film. The pressurizing process may include a press molding process. That is, the metal film is formed in a curved shape through the pressurizing process. Both ends of the pressurized metal film are curved or bent. Next, as illustrated in FIG. 5D, the curved metal film is positioned on a mold. When the curved metal film is fixed to the mold, any suitable method may be applied. For example, a fixing portion 113 formed on the curved metal film may be used. Specifically, the curved metal film is fixed to the mold through a hole 115 formed in the fixing portion 113. After that, as illustrated in FIG. 5E, polymer resin is discharged into the mold. That is, the curved polymer resin layer is manufactured to be integrated with the curved metal film through injection molding.

In this case, the curved surface of the curved metal film and the curved shape of the window have a shape corresponding to the mold. That is, the curved polymer resin layer having a proper shape is formed through this process. Then, a high-hardness film is stacked over the injection-molded curved polymer resin layer. When the high-hardness film and the curved polymer resin layer are coupled to each other, an adhesive film may be used. For example, an optically clear adhesive may be used.

Referring to FIGS. 6A to 9B, windows for a display device according to other exemplary embodiments of the present disclosure are described. Each of FIGS. 6A to 9B illustrates a corresponding exemplary embodiment. FIGS. 7A to 10A illustrate plan views, and the FIGS. 7B to 10B illustrate cross-sectional views of a manufacturing process.

Figure 6A:
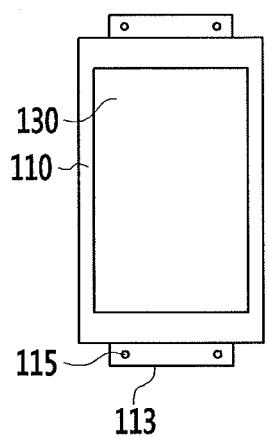
Figure 6B:
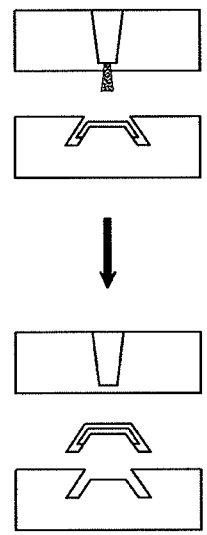

FIG. 6A illustrates a plan view of a part of constituent elements of a window for a display device according to another exemplary embodiment of the present disclosure. FIG. 6B illustrates a cross-sectional process illustrating a process for manufacturing the constituent elements of the window for a display device according to the exemplary embodiment of the present disclosure. Compared to the above-described constituent elements, a curved region of a curved metal film 110 according to the exemplary embodiment of the present disclosure has a slightly small length. Thus, when polymer resin is discharged into the mold, the polymer resin may cover even the bottom surface of the curved metal film. Because the edge of the curved metal film manufactured in such a manner is not exposed to the outside, a portion vulnerable to peeling may be prevented from being exposed.

Figure 7A:
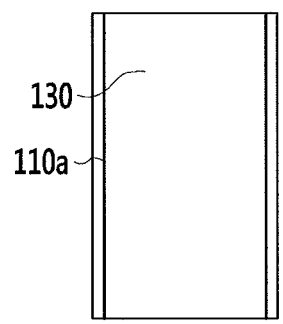
Figure 7B:
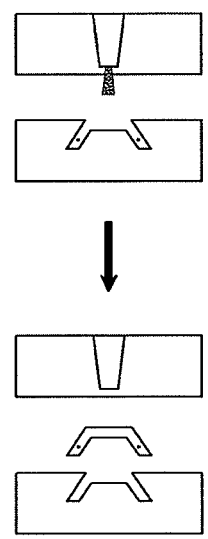

FIG. 7A illustrates a plan view of a part of constituent elements of a window for a display device according to another exemplary embodiment of the present disclosure. FIG. 7B illustrates a cross-sectional view of a process for manufacturing the constituent elements of the window according to the exemplary embodiment of the present disclosure. A metal film 110a illustrated in FIG. 7A is a pin-type metal film serving as a frame at both sides of the window 20, unlike the above-described metal films 110. The display device according to the exemplary embodiment of the present disclosure has curved surfaces formed at both ends thereof. Because stress concentration occurs at both ends, it is difficult for the display device to maintain a curve. Thus, as the pin-type metal film 110a is positioned at such positions, the rigidity of the window may be improved through the metallic property while the curling is maintained at the corresponding region. Further, as illustrated in FIG. 7B, the pin-type metal film 110a is surrounded by injection-molded polymer resin.

Figure 8A:
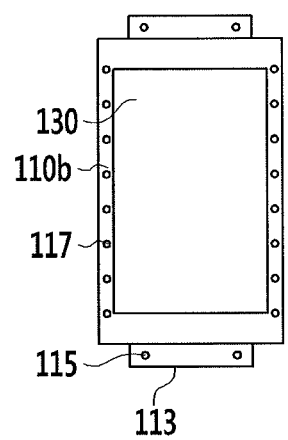
Figure 8B:
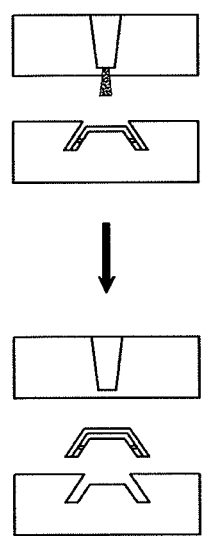

FIG. 8A illustrates a plan view of a part of constituent elements of a window for a display device according to another exemplary embodiment of the present disclosure. FIG. 8B illustrates a cross-sectional view of a process for manufacturing the constituent elements of the window according to the exemplary embodiment of the present disclosure. A curved metal film 110b illustrated in FIG. 8A includes a plurality of coupling grooves 117 at both ends thereof. When the curved metal film 110b is positioned on a mold and polymer resin is discharged into the mold, the polymer resin is positioned even in the coupling grooves 117. Thus, the curved metal film and the curved polymer resin layer may be coupled more densely and stably than in the other exemplary embodiments of the present disclosure. The size of the coupling grooves 117 is not limited, but the coupling grooves 117 may be set to any sizes for providing a proper coupling force. For example, the coupling grooves 117 may have a diameter of about 2 mm to 3 mm. The plurality of coupling grooves 117 may be positioned at even intervals.

Figure 9A:
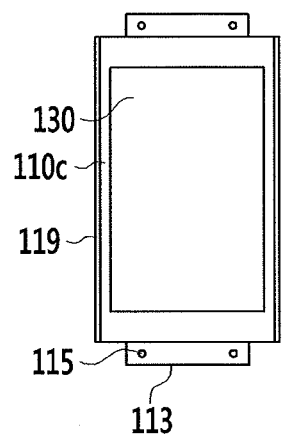
Figure 9B:
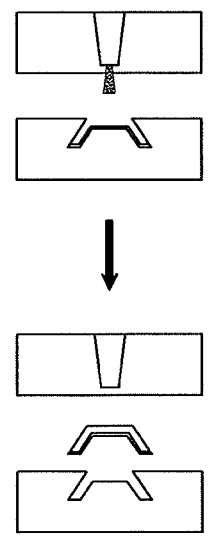

FIG. 9A illustrates a plan view of a part of constituent elements of a window for a display device according to another exemplary embodiment of the present disclosure. FIG. 9B illustrates a cross-sectional view of a process for manufacturing the constituent elements of the window according to the exemplary embodiment of the present disclosure. A curved metal film 110c according to the exemplary embodiment of the present disclosure further includes a protrusion 119 as illustrated in FIG. 9A. As illustrated in FIG. 9B, the protrusion 119 may cover an exposed bottom surface of the curved polymer resin layer. Such a structure may stabilize the curved polymer resin layer, and efficiently secure the rigidity of the curved polymer resin layer.

By way of summation and review, a curved window for a display device is provided by the present disclosure that has high hardness and high reliability, and exhibits improved strength. In particular, it is possible to provide a curved window which stably maintains the shape and a display device including the same. In contrast, when a curved window only uses a polymer resin, curling may occur when the curved window is exposed to a high temperature or high humidity. Further, when stress is concentrated in the curved region, the window may be deformed.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims. Although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A curved window for a display device, comprising:
a curved polymer resin layer;
a high-hardness film over the curved polymer resin layer; and
a curved metal film under the curved polymer resin layer, wherein the curved metal film has a thickness of about 0.1 mm to about 0.2 mm.

2. The curved window as claimed in claim 1, wherein the curved metal film is a stainless steel film.

3. The curved window as claimed in claim 1, wherein:
the curved metal film further includes a protrusion, and
the protrusion covers an exposed bottom surface of the curved polymer resin layer.

4. The curved window as claimed in claim 1, wherein the curved polymer resin layer has a thickness of about 1 mm or less.

5. The curved window as claimed in claim 1, further comprising an adhesive film between the high-hardness film and the curved polymer resin layer.

6. A curved window for a display device, comprising:
a curved polymer resin layer;
a high-hardness film over the curved polymer resin layer; and
a curved metal film under the curved polymer resin layer, wherein:
the curved metal film includes a plurality of coupling grooves formed at both sides thereof, and
the curved metal film and the curved polymer resin layer are coupled through the coupling grooves.

7. The curved window as claimed in claim 6, wherein the coupling grooves are positioned at even intervals.

8. A method for manufacturing a curved window, comprising:
preparing a curved metal film; and
injection-molding a curved polymer resin layer over the prepared curved metal film; stacking a high hardness film over the curved polymer resin layer,
wherein
the curved metal film has a thickness of about 0.1 mm to about 0.2 mm.

9. The method as claimed in claim 8, wherein preparing the curved metal film further includes:
cutting the metal film; and
pressurizing the cut metal film.

10. The method as claimed in claim 9, wherein both ends of the pressurized metal film are curved.

11. The method as claimed in claim 9, wherein pressurizing the cut metal film is performed through press molding.

12. The method as claimed in claim 8, wherein the curved metal film is a stainless steel film.

13. The method as claimed in claim 8, wherein:
the curved metal film includes a plurality of coupling grooves formed at both sides thereof, and
a part of the polymer resin is positioned in the coupling grooves through injection molding.

14. The method as claimed in claim 13, wherein the coupling grooves are positioned at even intervals.

15. The method as claimed in claim 8, wherein:
the curved metal film further includes a protrusion, and
the protrusion covers an exposed bottom surface of the curved polymer resin layer.

16. The method as claimed in claim 8, further comprising forming an adhesive film between the high-hardness film and the curved polymer resin layer.

17. A display device, comprising:
a display panel; and
a curved window over the display panel, wherein the curved window comprises:
a curved polymer resin layer, a high-hardness film over the curved polymer resin layer, and
a curved metal film under the curved polymer resin layer, and
wherein the curved metal film has a thickness of about 0.1 mm to about 0.2 mm.

* * * * *